United States Patent
Chen et al.

(10) Patent No.: US 7,257,412 B2
(45) Date of Patent: Aug. 14, 2007

(54) METHODS AND SYSTEMS FOR LOCATION ESTIMATION

(75) Inventors: Chao-Lin Chen, Hsinchu (TW); Kai-Ten Feng, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 102 days.

(21) Appl. No.: 11/113,579

(22) Filed: Apr. 25, 2005

(65) Prior Publication Data

US 2006/0240839 A1  Oct. 26, 2006

(51) Int. Cl.
*H04Q 7/20* (2006.01)
(52) U.S. Cl. .................. 455/456.1; 455/42.1; 342/387; 342/357.14; 342/357.02
(58) Field of Classification Search ............. 455/456.1, 455/456.5; 342/387, 357.14, 357.02
See application file for complete search history.

(56) References Cited

U.S. PATENT DOCUMENTS 5,999,129 A * 12/1999 Rose .......................... 342/394
6,360,078 B1 * 3/2002 Driedger et al. .......... 455/67.16
6,459,903 B1 * 10/2002 Lee .......................... 455/456.1
2001/0008393 A1 * 7/2001 Valio et al. ............. 342/357.02
2002/0167444 A1 * 11/2002 Lee ............................. 342/387
2004/0029558 A1 * 2/2004 Liu .......................... 455/404.2
2004/0127228 A1 * 7/2004 You et al. ................. 455/456.1
2004/0174297 A1 * 9/2004 Cho ....................... 342/357.14
2005/0138077 A1 * 6/2005 Michael et al. ........... 707/104.1
2005/0148346 A1 * 7/2005 Maloney et al. .......... 455/456.6

FOREIGN PATENT DOCUMENTS

TW  530508  5/2003

* cited by examiner

*Primary Examiner*—Joseph Feild
*Assistant Examiner*—David Q. Nguyen
(74) *Attorney, Agent, or Firm*—Thomas, Kayden, Horstemeyer & Risley

(57) ABSTRACT

Methods and systems for location estimation. Signals are received from a plurality of satellites and a plurality of base stations by a mobile station. The location of the mobile station is estimated according to TOA (Time-Of-Arrival) and TDOA (Time Difference-Of-Arrival) measurements calculated based on the signals.

8 Claims, 7 Drawing Sheets

METHODS AND SYSTEMS FOR LOCATION ESTIMATION

BACKGROUND

The present disclosure relates generally to methods and systems for location estimation, and more particularly, to methods and systems that estimate locations of mobile stations based on network-based and satellite-based signals.

Wireless location technologies have drawn a significant amount of attention over the past few decades. Different types of Location-Based Services (LBSs) have been proposed, including emergency 911 (E-911) subscriber safety services, location-based billing, navigation system, and applications for the Intelligent Transportation System (ITS). However, to meet all applications' needs, it is required to provide more accurate location estimation of a mobile device, such as a mobile phone, a smart phone, and a PDA under different environments.

A variety of wireless location techniques have been proposed. These techniques can be classified into network-based and satellite-based location schemes. The representative algorithms for the network-based location techniques are TDOA (Time Difference-Of-Arrival) and AOA (Angle-Of-Arrival) schemes. FIG. 1 is a schematic diagram illustrating a network-based architecture. In the TDOA scheme, a mobile station (MS) 110 receives signals coming from different wireless base stations (121, 122, and 123), and measures the time difference of the signals. In the AOA scheme, a home base station of the mobile station 110 observes the arrival angle of signals from the mobile station 110. On the other hand, the well-adapted technology for the satellite-based location method is GPS (Global Positioning System). FIG. 2 is a schematic diagram illustrating a satellite-based architecture. The mobile station 110 receives signals coming from a plurality of satellites (131 and 132), and measures TOA (Time-Of-Arrival) of the signals.

The performance of the location techniques, however, varies under different environments. For example, at rural areas, less base stations in a network-based system are installed, resulting in weak incoming signals or shortage of signal sources. Therefore, at rural areas, the network-based (i.e. TDOA, AOA) methods result in degraded performance for the location determination of mobile devices. On the other hand, the major problem for the satellite-based (i.e. GPS) method is that the performance considerably degrades when the satellite signals are severely blocked in urban valley areas.

SUMMARY

Therefore, it is desired to have a better location estimation method and system that adapt all kinds of environments. In the present invention, methods and systems for hybrid location estimation of mobile devices are provided.

In an exemplary embodiment of a method for location estimation, signals from a plurality of satellites are received by a mobile station, and TOA measurements are performed accordingly. The first position of the mobile station is estimated using an expansion method based on the TOA measurements. Signals from a plurality of base stations are received by the mobile station, and TDOA measurements are performed accordingly. The second position of the mobile station is estimated using the expansion method based on the TDOA measurements. The first and second positions are incorporated to estimate the location of the mobile station.

In an exemplary embodiment of a method for location estimation, signals from a plurality of satellites and a plurality of base stations are received by a mobile station. The location of the mobile station is estimated accordingly.

An exemplary embodiment of a system for location estimation comprises a plurality of satellites, a plurality of base stations, and a mobile station. The mobile station receives signals from the satellites, performs TOA measurements accordingly, and estimates the first position of the mobile station using an expansion method based on the TOA measurements. The mobile station further receives signals from the base stations, performs TDOA measurements accordingly, and estimates the second position of the mobile station using the expansion method based on the TDOA measurements. The mobile station incorporates the first and second positions to estimate the location thereof.

An exemplary embodiment of a system for location estimation comprises a plurality of satellites, a plurality of base stations, and a mobile station. The mobile station receives signals from the satellites, performs TOA measurements accordingly, and estimates a first position of the mobile station using an expansion method based on the TOA measurements. The mobile station further receives signals from the base stations, performs TDOA measurements accordingly, and transmits the first position of the mobile station and the TDOA measurements to a specific base station. The specific base station estimates a second position of the mobile station using the expansion method based on the TDOA measurements, and incorporating the first and second positions to estimate the location of the mobile station.

Methods for location estimation may take the form of program code embodied in tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein.

DESCRIPTION

Methods and systems for location estimation are provided.

Figure 1:
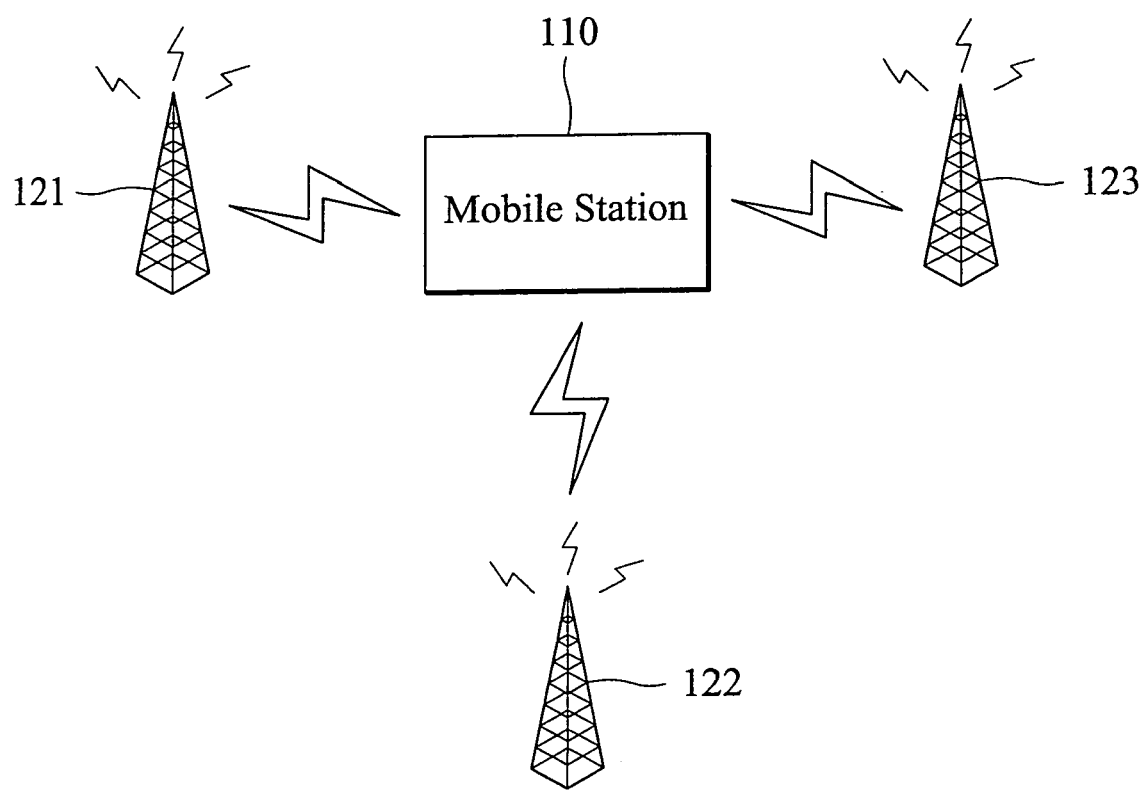
FIG. 1 is a schematic diagram illustrating a network-based architecture.
Figure 2:
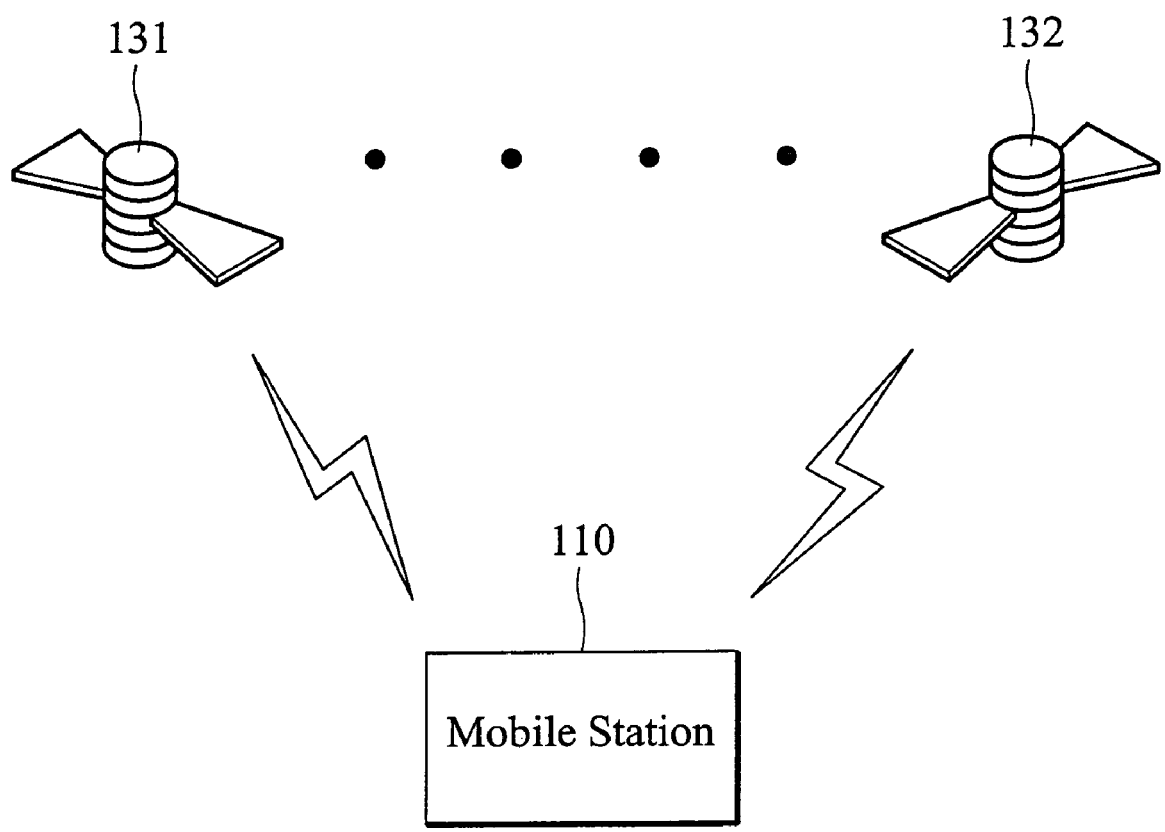
FIG. 2 is a schematic diagram illustrating a satellite-based architecture.
Figure 3:
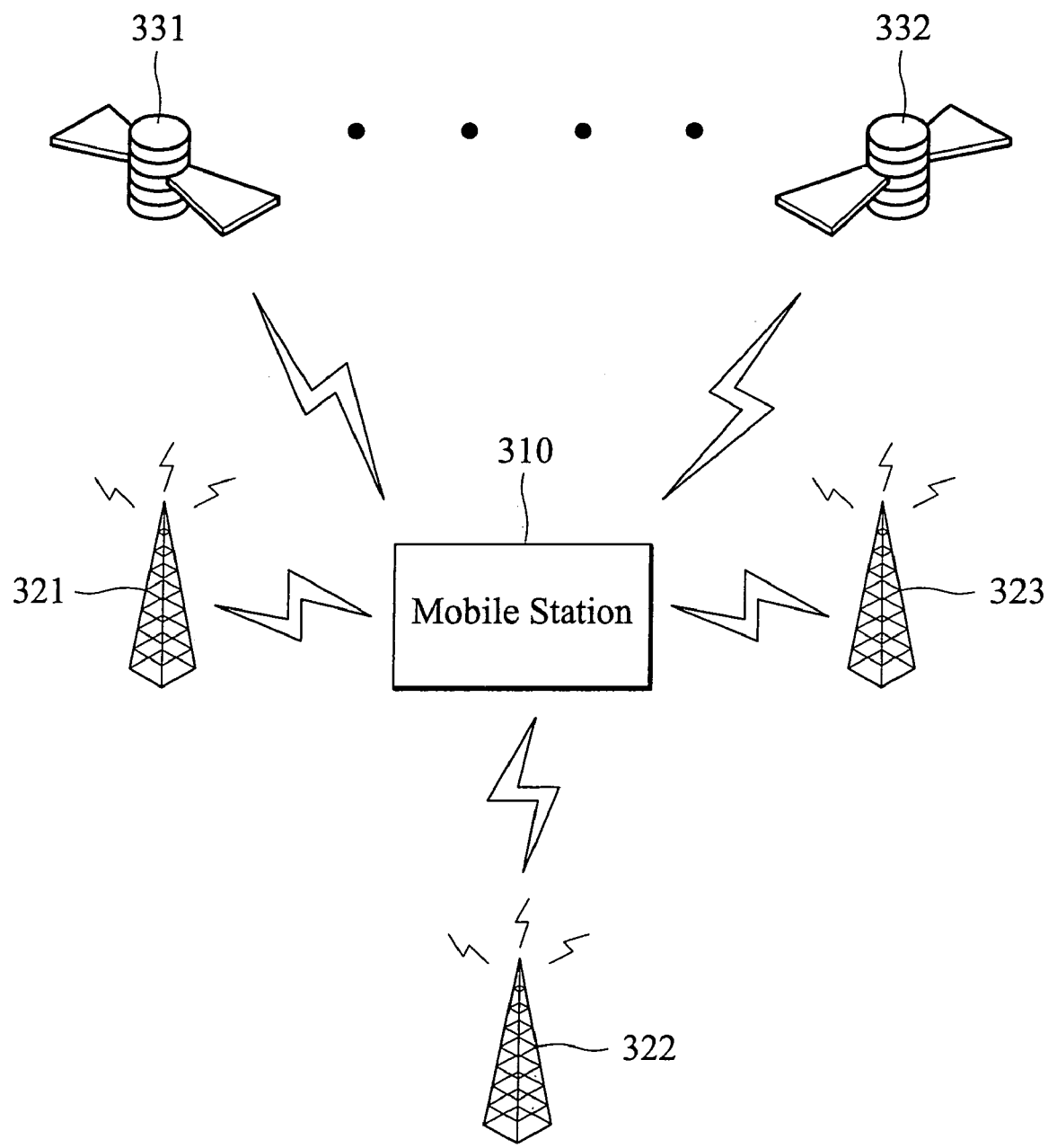
FIG. 3 is a schematic diagram illustrating an embodiment of a system for location estimation.

FIG. 3 is a schematic diagram illustrating an embodiment of a system for location estimation. The system combines the signals from both the GPS system and the cellular networks.

The system comprises a mobile station (MS) 310, such as a mobile phone, a smart phone, and a PDA, a plurality of base stations (BSs) (321, 322, and 323), and a plurality of satellites (331 and 332). The MS 310 is equipped with a GPS receiver (not shown). Additionally, each BS has a forward-link pilot channel that continuously broadcasts its pilot signals to provide timing and phase information for the MS 310 in the cellular network. Each BS has a dedicated reverse-link pilot channel from the MS 310 to provide initial acquisition, time tracking, and power control measurements. Each BS is equipped with antenna arrays for adaptive beam steering to facilitate the AOA measurement. The TDOA measurements are conducted at the MS 310 by obtaining the signals via the forward-link pilot channels from the BSs. It is called mobile-based mode. It should be noted that, depending on the capability of mobile devices, the TDOA measurements can also be conducted at the BSs, naming the mobile-assisted mode. On the other hand, the AOA signals are transmitted from the MS 310 to the BSs using the respective reverse-link pilot channels. The AOA measurements are performed at respective BS using its antenna arrays for two-dimensional adaptive beam steering. In some embodiments, to avoid signal degradation due to the near-far effect, the home BS of the MS 310 provides the capability of the AOA measurement, but is not limited thereto.

Figure 4:
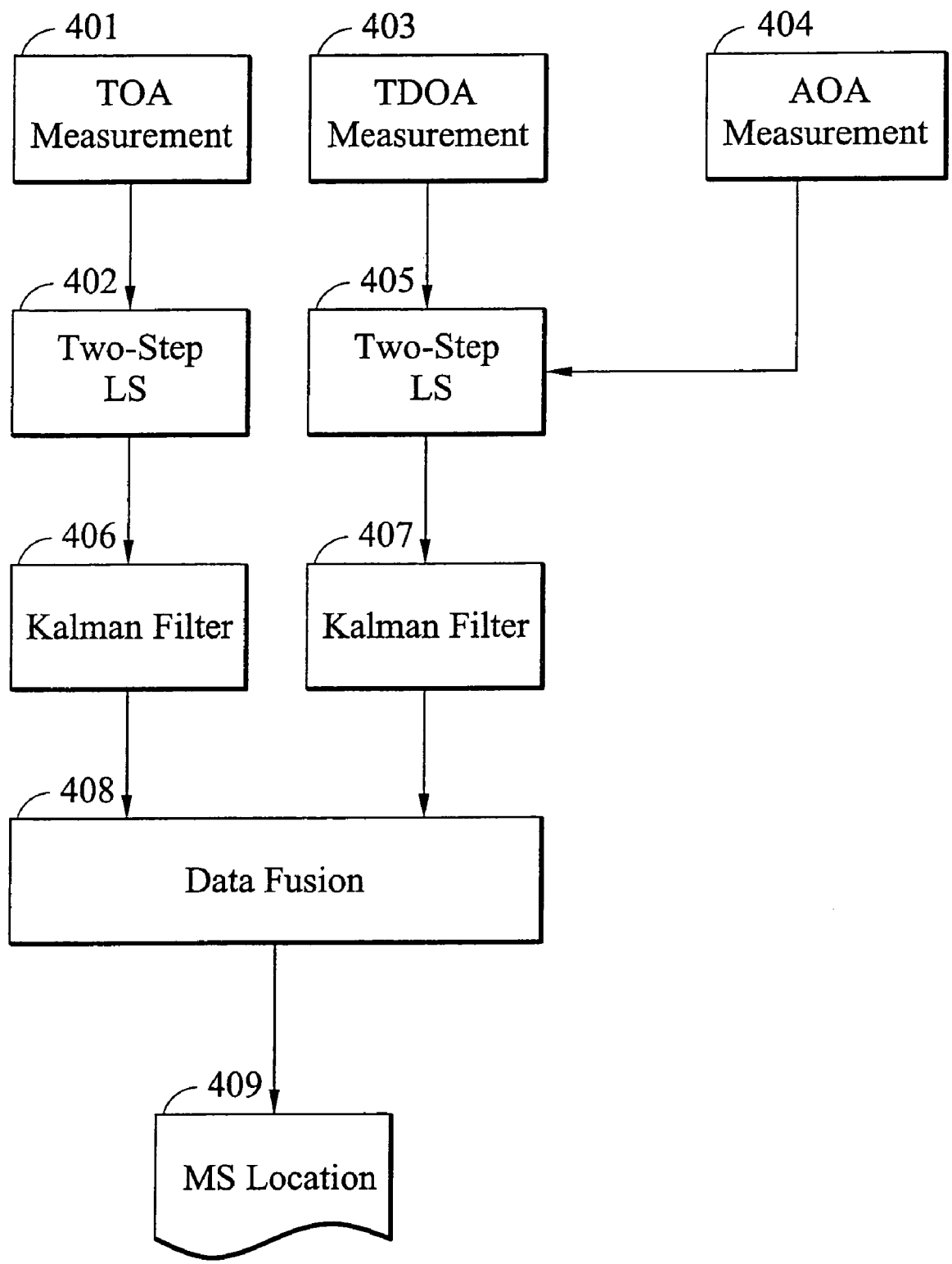
FIG. 4 is a flowchart of an embodiment of a method for location estimation.

FIG. 4 is a flowchart of an embodiment of a method for location estimation. The GPS-equipped MS receives signals from the satellites and conducts TOA measurements ($t_k$) (401). The MS processes the TOA measurements and estimates the three-dimensional position (i.e. $X_G=[x_G \ y_G \ z_G]^T$) of the MS using an expansion method (402). In this embodiment, the two-step least square (LS) method is employed, but is not limited thereto. Other approaches, such as using Taylor Expansion, Range-Scale Algorithm, Believable Factor Algorithm, and LLOP, may be adopted for the estimation. Additionally, TDOA measurements ($t_{i,j}$) are performed at the MS by obtaining signals from its home BS and the neighboring BSs via the forward-link pilot channels (403). The AOA measurement ($\theta$) is conducted at the home BS by receiving the signals from the MS via the reverse-link channel (404). The TDOA and AOA measurements are combined to estimate three-dimensional position ($X_C$) of the MS using the two-step LS method (405). A filtering technique is performed on the respective estimated positions ($X_G$ and $X_C$), to smooth measurement noise and track position data from both the TOA and the TDOA/AOA channels (406 and 407). In this embodiment, a Kalman filtering technique is employed, but is not limited thereto. Data fusion is then performed to incorporate both the means ($\bar{X}_G$) and ($\bar{X}_C$) of the filtered estimations ($\hat{X}_G$ and $\hat{X}_C$) from the TOA and the TDOA/AOA measurements based on their signal variations (408). The fused position estimate ($\hat{X}_f$) of the MS is obtained (409).

The location estimation of MS can be performed in either MS-assisted or MS-based mode. The two modes of systems depend on the requirement of the communication bandwidth and the computation power of the MS. The location estimation of the present invention can be applied to either MS-assisted or MS-based systems.

Figure 5:
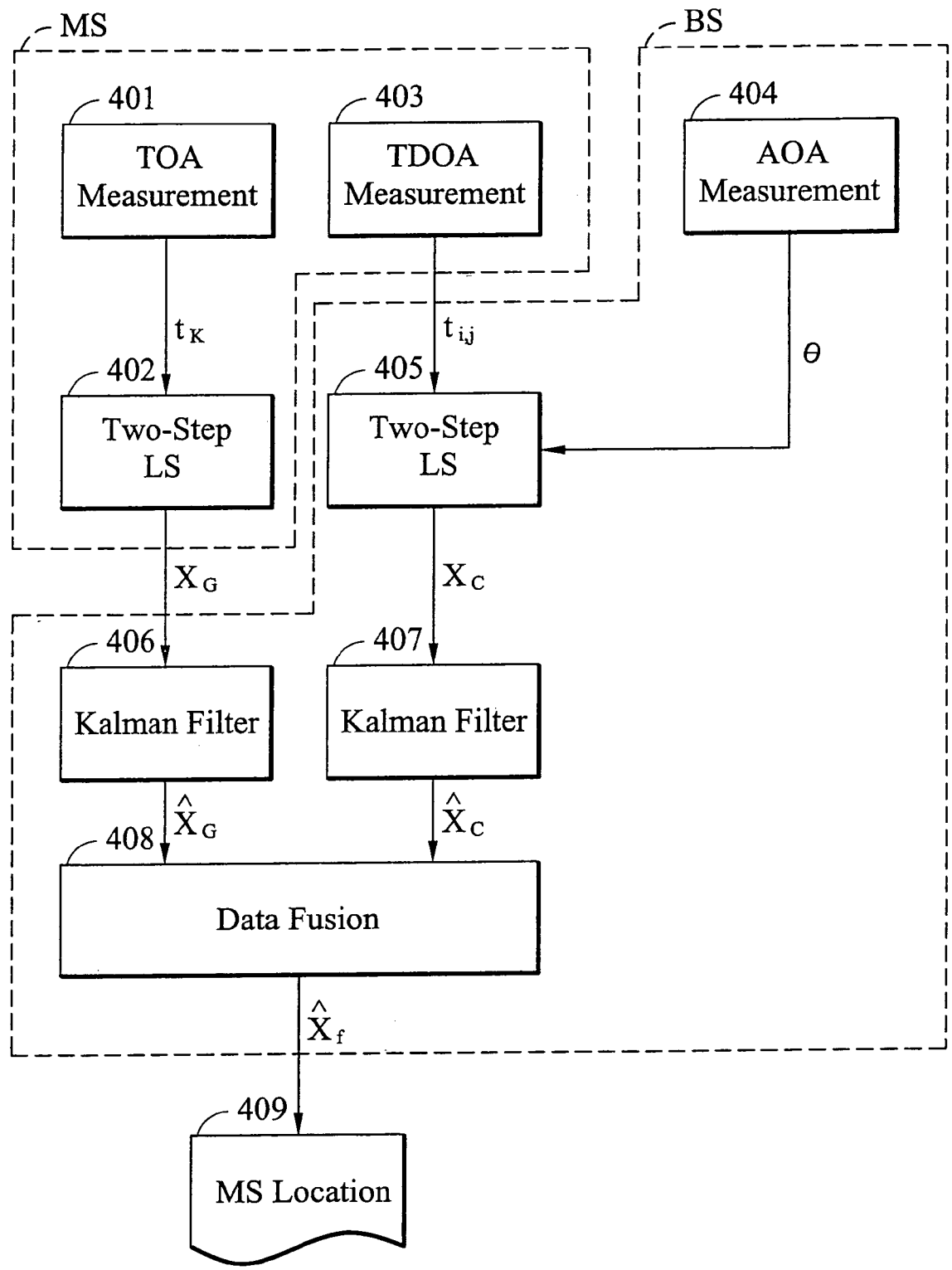
FIG. 5 is a schematic diagram illustrating an embodiment of a MS-assisted system for location estimation.

FIG. 5 is a schematic diagram illustrating an embodiment of a MS-assisted system for location estimation. This type of architecture is suitable for MS with insufficient computation capability. The GPS-equipped MS receives signals from the satellites and conducts TOA measurements ($t_k$). The MS processes the TOA measurements and estimates the three-dimensional position ($X_G$) of the MS using a two-step LS method. Additionally, the TDOA measurements are calculated at the MS by obtaining signals from its home BS and the neighboring BSs via the forward-link pilot channels.

These two sets of information, the location estimation ($X_G$) from the GPS system and the TDOA measurements ($t_{i,j}$) from the cellular network, are transmitted back to the home BS via the reverse-link pilot channel. The AOA measurement ($\theta$) is conducted at the home BS by receiving the signals from the MS via the reverse-link channel. A location server (not shown) at the home BS performs location estimation by combining the AOA and the TDOA measurements. The two-step LS method is utilized to estimate three-dimensional position ($X_C$) of the MS. The location server performs a Kalman filtering technique to smooth measurement noise and track position data from both the TOA and the TDOA/AOA channels, and performs data fusion to incorporate both the means ($\bar{X}_G$) and ($\bar{X}_C$) of the filtered estimations ($\hat{X}_G$ and $\hat{X}_C$) from the TOA and the TDOA/AOA measurements based on their signal variations. The fused position estimate ($\hat{X}_f$) of the MS is obtained.

Figure 6:
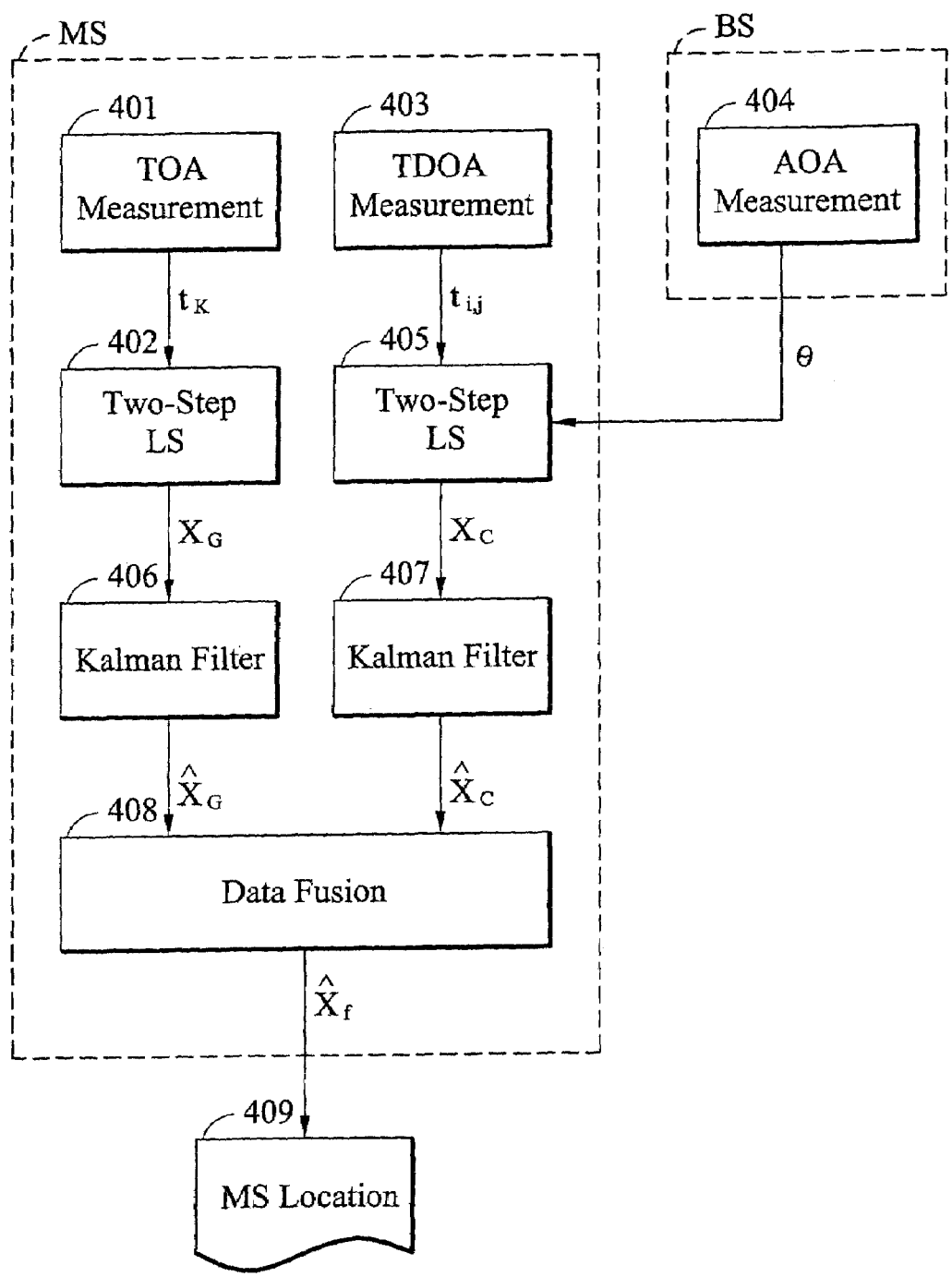
FIG. 6 is a schematic diagram illustrating an embodiment of a MS-based system for location estimation.

FIG. 6 is a schematic diagram illustrating an embodiment of a MS-based system for location estimation. This type of architecture is suitable for MS that possesses adequate computation capability. The AOA measurement ($\theta$) is obtained from the home BS and is transmitted to the MS via the forward link pilot channel. From the forward-link pilot channel, the MS computes the TDOA measurements ($t_{i,j}$) based on signals from its home and neighboring BSs. The MS performs location estimate ($X_C$) by combing the TDOA and the AOA measurements using the two-step LS method. The GPS-equipped MS receives signals from the satellites and provides location estimate ($X_G$) based on the TOA measurements ($t_k$). The Kalman filtering techniques are performed for both the TOA and the TDOA/AOA channels at the MS to obtain location estimates, $\hat{X}_G$ and $\hat{X}_C$. The final position estimation ($\hat{X}_f$) is acquired after the fusion results from means of the location estimates, $\bar{X}_G$ and $\bar{X}_C$.

The details of TOA, TDOA and AOA measurements, location estimation using the two-step LS method, Kalman filtering, and data fusion follow.

TOA, TDOA, and AOA Measurements

The mathematical models for the TOA, TDOA, and AOA measurements are presented. The three dimensional (3-D) coordinates of the MS are exploited in the proposed hybrid location estimation algorithm.

The 3-D TOA measurement $t_k$ from the GPS system is obtained by $$t_k = \frac{1}{c}r_{k,o} + n_k, k = 1, 2, \ldots, N, \tag{1}$$

where c is the speed of light, the subscript k represents the measurement with regard to the kth satellite, the subscript o represents the original time, and $n_k$ is the measurement noise associated with the TOA measurement $t_k$. The relative distance ($r_{k,o}$) between the MS and the kth satellite can be obtained as $$r_{k,o} = \sqrt{(x-x_k)^2+(y-y_k)^2+(z-z_k)^2} \tag{2},$$

where (x,y,z) represents the MS position, and ($x_k,y_k,z_k$) is the location of the kth satellite.

The 3-D cellular-based TODA measurement $t_{i,j}$ is obtained by computing the time difference between the MS with regard to the ith and the jth BSs:

$$t_{i,j} = \frac{1}{c}(r_{i,o} - r_{j,o}) + n_{i,j}, \quad (3)$$

where i and j represent the ith and the jth BS, and $n_{i,j}$ is the measurement noise of $t_{i,j}$.

In some embodiments, the antenna arrays at the home BS can measure the x and y directions, the AOA measurement (θ) of the cellular system is represented as $$\theta = \tan^{-1}\left(\frac{y - y_1}{x - x_1}\right) + n_\theta, \quad (4)$$

where θ is the horizontal angle between the MS and its home BS, $(x_1, y_1)$ is the horizontal coordinate of the home BS, and $n_\theta$ is the measurement noise of θ.

Location Estimation using Two-Step LS Method 3-D TOA Location Estimation

In some embodiments, it is required to obtain signals from at least four satellites (N≧4) to solve for the two-step LS problem from the TOA measurement. The 3-D TOA measurement as in (1) can be rewritten as $$Hx = J \quad (5),$$

where $$H = \begin{bmatrix} -2x_1 & -2y_1 & -2z_1 & 1 \\ -2x_2 & -2y_2 & -2z_2 & 1 \\ \vdots & \vdots & \vdots & \vdots \\ -2x_N & -2y_N & -2z_N & 1 \end{bmatrix},$$

$$x = [x \ y \ z \ R]^T,$$

$$J = \begin{bmatrix} r_1^2 - L_1 \\ r_2^2 - L_2 \\ \vdots \\ r_N^2 - L_N \end{bmatrix},$$

$R = x^2 + y^2 + z^2$, $L_k = x_k^2 + y_k^2 + z_k^2$, and $r_k = ct_k$ for k=1,2,..., N. Where $r_k$ is the measured distance between the MS and the kth satellite.

The concept of the two-step LS method is to acquire an intermediate location estimate in the first step, assuming that x, y, z and R are not correlated. The second step of the method releases this assumption by adjusting the intermediate result to obtain an improved location estimate, $X_G = [x_G \ y_G \ z_G]^T$. Further details of the two-step LS method are omitted here.

3-D TDOA/AOA Location Estimation

Figure 7:
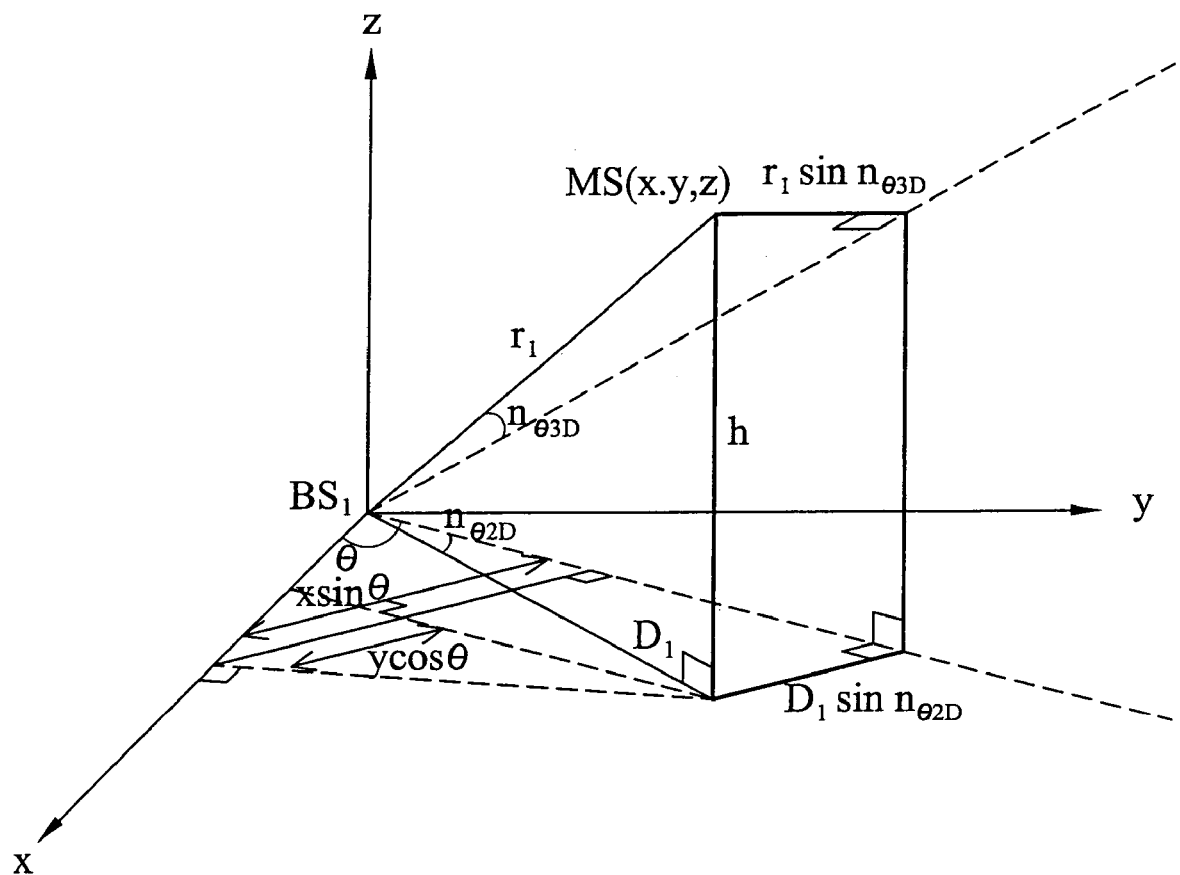
FIG. 7 is a schematic diagram illustrating the relationship between a mobile station and a home base station.

In order to evaluate the feasibility of using the 2-D AOA measurement for location determination of MS, it is necessary to investigate the geometric relationship between the MS and the home BS. FIG. 7 is a schematic diagram illustrating the relationship between a mobile station and a home base station. As shown in FIG. 7, the position of the home BS is defined as the reference point, and the geometric relationship resulting from AOA measurement noise $n_{\theta_{2D}}$ in x-y plane is shown as:

$$D_1 \sin n_{\theta_{2D}} = (x - x_1)\sin \theta - (y - y_1)\cos \theta \quad (6),$$

where $D_1 = \sqrt{(x-x_1)^2 + (y-y_1)^2}$. $r_{1,o}$ represents the relative distance between the MS and the home BS. When $D_1 \gg h$, $D_1 \approx r_{1,o}$. Hence, the approximation is $$D_1 \sin n_{\theta_{2D}} \approx r_{1,o} \sin n_{\theta_{2D}} \quad (7).$$

Therefore, (6) is changed as $$r_{1,o} \sin n_{\theta_{2D}} \approx (x - x_1)\sin \theta - (y - y_1)\cos \theta \quad (8).$$

Due to $\sin n_{\theta_{2D}} \approx n_{\theta_{2D}}$ when $|n_{\theta_{2D}}| \ll 1$, (8) can be approximately rewritten in linear form as $$0 \approx -(x - x_1)\sin \theta + (y - y_1)\cos \theta + r_{1,o} n_{\theta_{2D}} \quad (9).$$

The benefit of using the AOA measurement from the home BS is to reduce the requirement to obtain signals from one extra BS. Due to the limitation of the AOA measurement obtained from the two-dimensional antenna array, the vertical angle between the MS and the home BS, however, is not measurable. The undetermined vertical angle may result in excess errors in the geometric relationship (9), especially where the MS is close to the home BS location. Therefore, two cases are considered. In some embodiments, the AOA measurement further contains a distance-determining device (not shown), which determines whether the long distance case or the short distance case should be applied.

a) Long Distance Between the Home BS and the MS

In this embodiment, at least three TDOA measurements from the BSs and one AOA measurement from the home BS are required for location estimation. The 3-D TDOA and AOA measurements from (3) and (4) can be reformulated as (5), where $$H = -\begin{bmatrix} x_2 - x_1 & y_2 - y_1 & z_2 - z_1 & r_{2,1} \\ x_3 - x_1 & y_3 - y_1 & z_3 - z_1 & r_{3,1} \\ \vdots & \vdots & \vdots & \vdots \\ x_N - x_1 & y_N - y_1 & z_N - z_1 & r_{N,1} \\ -\sin\theta & \cos\theta & 0 & 0 \end{bmatrix},$$

$$x = [x \ y \ z \ r_{1,o}]^T,$$

and $$J = \frac{1}{2}\begin{bmatrix} r_{2,1}^2 - L_2 + L_1 \\ r_{3,1}^2 - L_3 + L_1 \\ \vdots \\ r_{N,1}^2 - L_N + L_1 \\ 2x_1\sin\theta - 2y_1\cos\theta \end{bmatrix},$$

and $r_{i,1} = ct_{i,1}$ for i=2,3,..., N. $r_{1,o}$ represents the relative distance between the MS and the home BS as in (2).

b) Short Distance Between the Home BS and the MS

Since it is not feasible to utilize the AOA measurement when the MS is in the neighborhood of the home BS, an additional 3-D TDOA measurement is required for location estimation. Hence, in this embodiment, at least four TDOA measurements are required for location estimation. The 3-D TDOA measurements form (2) can be written as (5) where $$H = -\begin{bmatrix} x_2 - x_1 & y_2 - y_1 & z_2 - z_1 & r_{2,1} \\ x_3 - x_1 & y_3 - y_1 & z_3 - z_1 & r_{3,1} \\ \vdots & \vdots & \vdots & \vdots \\ x_N - x_1 & y_N - y_1 & z_N - z_1 & r_{N,1} \end{bmatrix},$$

$$x = [x \quad y \quad z \quad r_{1,o}]^T,$$

and $$J = \frac{1}{2}\begin{bmatrix} r_{2,1}^2 - L_2 + L_1 \\ r_{3,1}^2 - L_3 + L_1 \\ \vdots \\ r_{N,1}^2 - L_N + L_1 \end{bmatrix}.$$

Kalman Filtering

The Kalman filtering technique is employed in this embodiment for post-processing of signals. It provides the capabilities of range measurement, smoothing, and noise mitigation for the TOA and TDOA/AOA data. Furthermore, the Kalman filter can also be utilized for trajectory tracking of the MS. The measurement process and the state equation for the Kalman filter can be written as $$X_k = C\hat{X}_k + e_k \quad (10),$$

$$\hat{X}_k = A\hat{X}_{k-1} + w_{k-1} \quad (11),$$

where $X_k = [x_k \ y_k \ z_k]^T$ is the measured data from either $\hat{X}_C$ or $\hat{X}_G$ at the time instant k, $\hat{X}_k = [\hat{x}_k \ \hat{y}_k \ \hat{z}_k \ v_{x_k} \ v_{y_k} \ v_{z_k}]^T$ is the estimated state vector, and $e_k$ and $w_k$ are the process and measurement noises. The matrix C in (10) relates the state ($\hat{X}_k$) to the measurement ($X_k$) as $$C = \begin{bmatrix} I & \Delta tI \\ 0 & I \end{bmatrix}.$$

The matrix A in (11) is the state transition matrix as M=[I 0]. This embodiment applies the Kalman filtering technique to both TOA and TDOA/AOA channels, but is not limited thereto.

Data Fusion

The main function of data fusion is to merge disparate types of information to enhance positioning accuracy. By merging the TOA and TDOA/AOA estimates, the resulting data provides feasible location estimates under different environments (e.g. urban, suburban, and rural). In this embodiment, the fusion process is based on the Bayesian Inference model, which improves an estimate with known signal variations. It is understood that the fusion process is not limited to the Bayesian Inference model. The final position estimate and its variance are obtained as follows:

$$\hat{X}_f = \frac{\sigma_G^2}{\sigma_G^2 + \sigma_C^2}\hat{X}_C + \frac{\sigma_C^2}{\sigma_G^2 + \sigma_C^2}\hat{X}_G \quad (12)$$

and $$\sigma_f^2 = \frac{1}{\frac{1}{\sigma_C^2} + \frac{1}{\sigma_G^2}}, \quad (13)$$

where $\hat{X}_C = [\bar{x}_C \ \bar{y}_C \ \bar{z}_C]^T$ is the mean of the location estimate $\hat{X}_C$ from the TDOA/AOA channels, $\hat{X}_G = [\bar{x}_G \ \bar{y}_G \ \bar{z}_G]^T$ is the mean of the location estimate $\hat{X}_G$ for the TOA channel, $\sigma_C$ is the standard deviation of $\hat{X}_C$, and $\sigma_G$ is the standard deviation of $\hat{X}_G$.

The hybrid location estimation determines the MS location by combining outcomes from both network-based and satellite-based techniques. In addition to the longitude and latitude of MS, the altitude information of MS is also obtainable therefrom. The accuracy of location estimation can thus be improved.

Methods for determining operational settings, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. A method for location estimation of a mobile device, comprising:
   performing TOA (Time-Of-Arrival) measurements according to signals from a plurality of satellites;
   estimating a first position using an expansion method based on the TOA measurements;
   performing TDOA (Time Difference-Of-Arrival) measurements according to signals from a plurality of base stations;
   performing an AOA (Angle-Of-Arrival) measurement by a specific base station;
   estimating a second position using the expansion method based on the TDOA and AOA measurements;
   determining whether the distance between the mobile device and the specific base station is above a threshold; and
   incorporating the first and second positions to estimate the location of the mobile station.

2. The method of claim 1 further comprising: smoothing the first and second positions by a filtering technique.

3. The method of claim 2 wherein the filtering technique is Kalman filtering.

4. The method of claim 1 wherein the specific base station is a home base station of the mobile device.

5. The method of claim 1 further comprising: estimating the first position using the expansion method based on the TOA measurements and the locations of respective satellites.

6. The method of claim 1 further comprising: estimating the second position using the expansion method based on the TDOA measurements and the locations of respective base stations.

7. The method of claim 1 wherein the expansion method is two-step Least Square (LS) method.

8. The method of claim 1 wherein the first and second positions are incorporated by a Bayestian statistical inference model to estimate the location of the mobile station.

* * * * *